United States Patent [19]

Greenlee et al.

[11] Patent Number: 5,104,741
[45] Date of Patent: Apr. 14, 1992

[54] PLASTICIZED ARTICLES HAVING VINYL RESIN-BASED PRODUCTS IN CONTACT WITH POLYMERIC OR POLYMER COATED SUBSTRATES

[75] Inventors: William S. Greenlee, Avon Lake; Ross J. Cozens, Strongsville, both of Ohio

[73] Assignee: The BF Goodrich Company, Brecksville, Ohio

[21] Appl. No.: 418,318

[22] Filed: Oct. 6, 1989

[51] Int. Cl.$^5$ .................. B32B 15/08; B32B 27/30
[52] U.S. Cl. .................. 428/458; 428/421; 428/463; 428/483; 428/500; 428/517; 428/518; 428/521; 428/522
[58] Field of Search ............ 428/518, 522, 463, 421, 428/514, 483, 500, 458, 521

[56] References Cited

U.S. PATENT DOCUMENTS

| | | | |
|---|---|---|---|
| 3,972,962 | 8/1975 | Williams et al. | 260/873 |
| 4,069,517 | 5/1973 | Graham | 3/1.4 |
| 4,209,437 | 7/1978 | Fischer | 260/31.8 R |
| 4,711,908 | 4/1987 | Hawrylko | 521/56 |
| 4,742,085 | 5/1988 | Cozens | 521/56 |
| 4,806,393 | 2/1989 | Levin | 427/384 |
| 4,824,990 | 4/1987 | Mertz et al. | 560/90 |

OTHER PUBLICATIONS

"BFGoodrich Geon ® 3400 and 3500 Product Brochure".

Primary Examiner—Paul J. Thibodeau
Assistant Examiner—D. S. Nakarani
Attorney, Agent, or Firm—Miles Dearth; Joe A. Powell

[57] ABSTRACT

Products formed from crosslinked vinyl resins and a plasticizer exhibit a low degree of marring after contacting polymeric substrates or substrates coated with a polymeric layer.

18 Claims, No Drawings

PLASTICIZED ARTICLES HAVING VINYL RESIN-BASED PRODUCTS IN CONTACT WITH POLYMERIC OR POLYMER COATED SUBSTRATES

BACKGROUND OF THE INVENTION

This invention relates to articles having polymeric substrates or polymeric coated substrates in contact with plasticized vinyl resin based products.

Certain articles use gaskets to provide an air tight seal. These gaskets can be made from plasticized vinyl resins. Because of the relatively high amount of plasticizer used in the vinyl resin composition, the plasticizer can migrate out of the composition over a period of time or under high temperature conditions. This plasticizer migration can tend to mar the surface of the article if the surface is a polymeric surface or the surface has a polymeric coating. For example, in refrigerators, the walls can be painted with a polyester-based paint and it has been observed that gaskets made from plasticized vinyl resins can undesirably mar this painted surface.

One method of solving the problem of marring of the product surface is to employ plasticizers which have a low affinity for the surfaces of the article. One class of plasticizers is disclosed in U.S. Pat. No. 4,824,990 and has a low affinity for polystyrene and ABS resins. Unfortunately, that solution is restricted to the specific plasticizers and surfaces, and does not address the problem of metal substrates coated with a polyester-based paint being marred by plasticized vinyl resins. It would be desirable to have a vinyl resin composition which would exhibit lower marring due to reduced plasticizer migration. Thus, the plasticizer could be selected on the basis of its primary use of improving the processability of the resin and not based on its affinity for the surfaces the plasticized vinyl resin will contact.

Therefore, it is an object of the invention to provide a product formed from a plasticized vinyl resin composition, which product could be used in contact with polymeric substrates or a polymeric coated substrate of an article, and which product would exhibit a low degree of marring of the surface of the substrate under conditions of ordinary use.

SUMMARY OF THE INVENTION

This invention is an article comprising a polymeric substrate or a polymeric coated substrate providing a surface for the article and a product formed from a plasticized vinyl resin composition, said vinyl resin composition comprising a plasticizer and a crosslinked vinyl halide resin. The product is in physical contact with the surface of the article.

The surface of the articles of this invention exhibit a low degree of marring for a variety of different plasticizers. The crosslinked skinless vinyl halide resins used in this invention absorb the plasticizer quickly as well as retain the plasticizer over a wide range of conditions. Thus, the products formed from the highly plasticized crosslinked vinyl halide resins can be used in a wide variety of articles which have polymeric substrates or polymeric coated substrates in contact with the vinyl halide resin product.

DETAILED DESCRIPTION OF THE INVENTION

The vinyl halide resins of this invention are prepared from at least one vinyl halide monomer. Although copolymers of the vinyl halide and a comonomer are suitable, the preferred resins are homopolymers of the vinyl halide. Examples of suitable comonomers are monomers which have a terminal vinylidene, i.e., $CH_2=C<$ grouping. Examples of suitable comonomers are esters of acrylic acids and methacrylic acid; aromatic and aliphatic olefinically unsaturated monomers and the like. Specific comonomers are known and are disclosed in, for example, U.S. Pat. No. 4,742,085. Such comonomers are employed at between 0 to 50%, and preferably at between 0 to 20% of the total weight of monomers.

The vinyl halide resins of this invention are crosslinked. The resins are crosslinked by adding a suitable crosslinking agent. Although technically a copolymer is formed of the vinyl halide monomer and crosslinking agent, such a small amount of the agent is employed relative to the amount of vinyl monomer, that the resin will be referred to herein as a homopolymer if a single vinyl halide monomer is employed, and a copolymer if a comonomer is employed with the vinyl halide monomer. Preferred agents are di- or polyfunctional, are soluble in the vinyl monomer and vinyl polymer and have reactivity ratios such that the agents prefer to react with the monomer rather than add to itself. The amount of crosslinking agent added is no greater than the amount which will be completely reacted before the polymerization of the polymer is completed so that no amount of residual agent is present in the polymer. Suitable crosslinking agents include diallyl phthalates, diallyl esters of ethylenically unsaturated dibasic acids, diallyl esters of saturated dibasic acids, divinyl ethers, diacryl and dimethacryl esters of polyhydric alcohols, and similar di- or polyfunctional compounds. The crosslinking agent can be premixed with vinyl monomer before charging, charged directly into the polymerization medium, or metered into the medium during the polymerization. Generally, premixing the agent with the monomer is preferred. Methods and types of agents for preparing crosslinked vinyl resins are disclosed in U.S. Pat. No. 4,742,085, herein incorporated by reference.

Preferably, the crosslinked resins are also skinless. A skinless resin is one which is free of a substantially continuous pericellular membrane. Suitable resins are disclosed in U.S. Pat. Nos. 4,711,908 and 4,824,990, and their respective divisional applications. These resins are preferred because they have a faster rate of plasticizer pick-up than skin-containing crosslinked resins. Skinless resins can be prepared in a mass polymerization process such as is described in U.S. Pat. No. 3,522,227, herein incorporated by reference. Preferably, the resins are prepared in suspension such as is described in U.S. Pat. No. 4,742,085, herein incorporated by reference. In one method, a primary dispersant is used which is ionic sensitive, thickens the suspending medium at low amounts, and is "removed" from the system during the polymerization reaction by adding an ionic material. Examples of such dispersants include crosslinked polyacrylic acid polymers, crosslinked ethylene maleic anhydride polymers, high molecular weight uncrosslinked polyacrylic acid polymers and ethylene maleic acid polymers. Suitable ionic materials are bases which can neutralize the primary dispersant and form a salt. By removing the primary dispersant, a skin is prevented from forming on the resin particles. As a result, skinless, friable resin particles are formed. An alternative method is to use very low levels of the ion sensitive dispersant and a secondary dispersant which is monomer soluble and effectively insoluble in water. Suitable secondary dispersants include oil-soluble non-polyethylene oxide containing compounds from sorbitan esters, glycerol esters or polyglycerol esters.

The preferred vinyl resins for use in this invention are vinyl chloride resins or polyvinyl chloride. The preferred crosslinking agent is diallyl phthalate. In one method, to prepare the preferred crosslinked skinless polyvinyl chloride resins, one hundred parts by weight of vinyl chloride monomer, 150 parts by weight of demineralized water, 0.025 parts by weight ion sensitive dispersant, 0.3 parts by weight of a secondary dispersant, about 0.2 to about 0.5 parts per weight diallyl phthalate and a solution containing about 0.045 parts by weight of a free radical catalyst are charged to a reactor. The system is evacuated of residual oxygen. The reaction mixture is thoroughly agitated and the polymerization is conducted at from about 50-60° C. to about 1% to 2% conversion, and then sodium hydroxide is added to desorb the ion sensitive dispersant from the monomer droplet. The polymerization is then completed to the desired degree of polymerization.

The preferred crosslinked skinless resins useful in this invention exhibit a complex viscosity measured at 210° C. and a frequency of 1 cm$^{-1}$ of from about $0.9 \times 10^5$ poise to about $1000.0 \times 10^5$ poise, and more preferably from about $4.0 \times 10^5$ to about $60.0 \times 10^5$ poise. The resins have a tanδ measured at 210° C. and a frequency of 1 cm$^{-1}$ of less than 1.0, preferably from about 0.1 to about 0.95, more preferably from about 0.3 to about 0.7. Generally, the lower the tanδ, the higher the degree of crosslinking, and the higher degree of plasticizer retention. Another property exhibited by the preferred resins is a mercury porosity of from about 0 1 cc/g to about 0.8 cc/g, preferably from about 0.3 cc/g to about 0.5 cc/g. As indicated by this porosity level, the particles are highly friable. The resin particles have an agglomerated non-spherical shape having a shape factor less than about 0.85, preferably less than about 0.83, more preferably less than about 0.80, and a weight average particle size of from about 70 microns to about 1000 microns, preferably from about 100 microns to about 250 microns. Also, the surface of the particles is substantially free of a continuous pericellular membrane. The absence of such a membrane is indicated when the surface of the particle is greater than about 20% polyvinyl chloride, preferably greater than about 50%, more preferably greater than about 60% as measured by ESCA. The crosslinked skinless resins have short powder mix times at 86.5° C. of less than 400 seconds, preferably less than 300 seconds and more preferably less than 270 seconds.

Any of the known types of plasticizers are useful in the vinyl compositions used in this invention. Examples of such plasticizers are disclosed in *The Technology of Plasticizers*, by Sears and Darby, pages 893-1085, John Wiley & Sons, New York, 1982. Generally, suitable plasticizers are monoesters of carboxylic acids having 2-20 carbon atoms, diesters of dicarboxylic acids having 2-20 carbon atoms, triesters of tricarboxylic acids containing 3-20 carbon atoms, diesters of diols containing 2-100 carbon atoms, triesters of triols containing 3-150 carbon atoms, hydrocarbon-based oils containing 10-200 carbon atoms, and epoxidized products containing 5-100 carbon atoms. Although high molecular weight, highly branched and/or low solubility parameter (i.e., ≦9.8 by Small's method) monomeric or polymeric plasticizers are specifically designed to be retained by the resins, other plasticizers are useful and are retained at high use levels by the crosslinked and skinless crosslinked vinyl halide resins used in this invention. Although improved plasticizer retention is observed at 20 phr, highly advantageous retention is observed even at such high plasticizer use levels of greater than about 60 parts, and preferably greater than 75 parts per hundred parts of resin.

Examples of preferred plasticizers are monomeric plasticizers having a molecular weight of above 370, the esters and ethers of the phthalates and trimellitates, and polymeric plasticizers having a weight average molecular weight of greater than about 1000. More preferably, the plasticizers are phthalate esters from alcohols having greater than or equal to 8 carbon atoms, polyesters of diacids containing greater than 5 carbon atoms, polyesters of glycols, polyesters having a weight average molecular weight of greater than about 2000, monomeric plasticizers having a molecular weight of greater than 440, diolefin-based polymeric plasticizers having a nitrile comonomer, ethylene containing polymers of an unsaturated ester of a carboxylic acid containing at least three carbon atoms. More highly preferred plasticizers are phthalate esters of alcohols having greater than or equal to 10 carbon atoms, polyesters of diacids having greater than or equal to 7 carbon atoms, monomeric plasticizers having molecular weights of greater than about 520, monomeric plasticizers having solubility parameters of less than about 9.8 as measured by Small's method; polyesters of glycols having greater than 3 carbon atoms and at least one tertiary carbon atom, diolefins having acrylonitrile comonomers. Examples of specific highly preferred plasticizers include polyesters of sebacic and dodecanoic acid; tri-2-ethylhexyl trimellitate, tri(N-oxyl,N-decyl)trimellitate; di-2-ethylhexyl phthalate; diisodecyl phthalate; polyesters of neopentyl glycol; acrylonitrile-butadiene copolymers; ethylene-vinyl acetate copolymers; ethylene-vinyl acetate-carbon monoxide terpolymer. Di-2-ethylhexyl phthalate is especially preferred.

Plasticizer retention can be measured by loading the resin with plasticizer, forming an article from the resin and plasticizer composition, and measuring the weight loss of the article after heating the article at 100° C. for seven days. At plasticizer levels of 130 parts per hundred parts of resin, an article made using the crosslinked skinless vinyl resin of this invention will lose less than about 12%, preferably less than 10%, of its initial weight. As a comparison, a non-crosslinked skinless resin can typically lose greater than 13% of its initial weight under such conditions.

The plasticizer is employed in a plasticizing amount of the vinyl resin composition. Such amount can vary according to the type of plasticizer employed, and the use for the vinyl resin product, but typically ranges from about 10 parts to about 200 parts per 100 parts by weight resin, preferably from about 30 parts to about 140 parts per 100 parts by weight resin, and more preferably from about 60 to about 130 parts per 100 parts by weight of resin. For most gasket-type applications, less than 60 phr of plasticizer provides a product which is difficult to process commercially, and above 130 phr of plasticizer, the product is too flexible to be of use.

The vinyl halide resin useful in this invention can also be a blend of two or more vinyl halide polymers. Such blends can provide advantageous properties such as processing and even reduced marring. The amount of each resin employed in the blend can vary according to the desired result sought. It has been observed that an equal weight blend of a crosslinked skinless vinyl halide homopolymer, and a non-crosslinked skin-containing vinyl halide homopolymer can exhibit a lower degree of marring than either of the resins used alone. The skin-containing resins are prepared by conventional methods in which the dispersant employed is not removed during the polymerization. Thus, such resins have a substantially continuous pericellular membrane and have surfaces which are less than 15% polyvinyl halide as measured by ESCA. A highly preferred blend is a two component equal weight blend of crosslinked skinless polyvinyl chloride and non-crosslinked skin-containing polyvinyl chloride. Such a blend readily mixes with a high level of plasticizer, is readily processible, exhibits a high degree of plasticizer retention and reduced marring of polymeric substrates or polymeric-coated substrates.

Other components can be added to the vinyl resin composition as required by the desired end use. Examples of such components include stabilizers, pigments, fillers, lubricants and the like. Another additive which can provide a refrigerator gasket is magnetized metal shavings which are dispersed throughout the vinyl resin composition to render the eventual product magnetic.

The vinyl resin composition is formed into the desired product by using processing equipment typically used for thermoplastics. Such equipment includes extruders, injection molding equipment, calenders, Banburies, mills, thermoforming equipment, and the like.

The product formed from the vinyl resin composition is in physical contact with a surface provided by a polymeric substrate or a substrate coated with a polymeric layer. Preferred polymeric layers are the types of polyester-based paints or enamels from PPG, Hanna Corp. and Lilly Corp.

The vinyl resin-based product contacts the surface of the article which is provided by the polymeric substrate or polymeric coated substrate. The surface exhibits a low degree of marring under normal use conditions due to the high plasticizer retaining capability of the resin. This reduced marring can be demonstrated by contacting the vinyl resin-based product to the surface and exposing the surface and vinyl resin product to a temperature equal to or above about 43.2° F. for seven days. Although these conditions are somewhat more strenuous than those typically encountered in practical uses for the vinyl resin-based product, such as the use as a refrigerator gasket, a low degree of marring is still observed.

The following examples are provided to illustrate the concept of the invention but not to limit the scope of the claims.

EXAMPLE 1

Two types of crosslinked skinless polyvinyl chloride resins are plasticized with a polyester of a carboxylic acid available from C. P. Hall Co. as Paraplex ® G-57. About 80 parts of plasticizer per hundred parts of resin are used, and 6.5 parts per hundred parts of resin of each of a stabilizer and costabilizer are added.

Resin Sample 1 is a crosslinked skinless polyvinyl chloride resin available from B. F. Goodrich Co. as Geon ® 3500. It has a bulk density of 0.455 gm/cc, an average particle size of 132 microns, a mercury Porosity of 0.4, a complex viscosity of $15 \times 10^5$ and a crosslink density of 0.56 tan $\delta$ measured at 210° C., and 1 cm$^{-1}$.

Resin Sample 2 is a crosslinked skinless polyvinyl chloride resin available from B. F. Goodrich Co. as Geon ® 3400. It has a bulk density of 0.410 gm/cc, an average particle size of 156 microns, a mercury porosity of about 0.4, a complex viscosity of about $20 \times 10^5$ and a crosslink density of 0.45 tan$\delta$ measured at 210° C. and 1 cm$^{-1}$.

The resin, plasticizer and stabilizers are mixed in a Henschel mixer and then milled on a 6"×13" two-roll mill. The Samples are removed from the mill as sheets and compression molded.

The molded Resin Samples are placed in contact with steel panels which are painted with a polyester-based paint. A set of three panels painted with a polyester-based paint, available from Lilly Corp. as Ultra FLEX-AR ® Appliance Enamel, in contact with molded Resin Sample 1 and a set of three panels also painted with Ultra FLEXAR ®, in contact with molded Resin Sample 2 are heated between 70° and 72.7° C. in a forced air circulating oven for 17 days. Another set of three like-painted panels in contact with molded Resin Sample 1 and another set of three like-painted panels in contact with molded Resin Sample 2 are heated at 43.3° C. and 99% humidity for 17 days. In this second set of samples, the Resin Samples are held against the steel panels by magnets.

After testing, a mar rating is assigned to each panel. The mar rating is based on three characteristics. The first is a blister rating, and each panel is given a rating of between 1 and 10, with 1 indicating heavy blistering and 10 indicating no blistering. The second characteristic is stickiness, and each panel is given a value of +1 if there is no stickiness, 0 if it is somewhat sticky, −1 if it is very sticky and −2 if it is extremely sticky. The final characteristic is ring formation. If the sample leaves a ring on the panel, a value of −1 is assigned, while no ring gets a +1. The three values are added to provide the mar rating for the sample. A mar rating of above 5 indicates a low degree of marring.

The mar ratings of the panels in contact with the respective Resin Samples are averaged. For the 6 panels in contact with Resin Sample 1, the average mar rating is 5.7. For the 6 panels in contact with Resin Sample 2, the average mar rating is 9.3.

EXAMPLE 2

Additional samples using the above-described formulations are prepared by milling on a two-roll mill as described above, followed by cubing the sheets and then extruding the cubes on a single screw, ¾" extruder into a 4" wide sheet. Resin Sample 3 employs Geon ® 3500, Resin Sample 4 employs Geon ® 3400, and Resin Sample 5 is a 50/50 blend by weight of Geon ® 3400 and a non-crosslinked skin-containing resin available as Geon ® 30 from the B. F. Goodrich Co. Geon ® 30 has an intrinsic viscosity of 1.02, a bulk density of 0.5, a particle size of 150 microns, a mercury porosity of 0.33 and a powder mix time measured at 86.5° C. of about 300 seconds. The same type of polyester plasticizer which is employed in Resin Samples 1–4 is employed for Sample 5.

One sheet of each of the Resin Samples is placed in contact with steel panels coated with polyester-based paint, and one sheet of each of the Resin Samples is placed in contact with panels of ABS. The panels and Samples are heated at 65.5° C. in a forced air circulating oven for seven days at a pressure of about two psig. The same criteria as in Example 1 are measured to provide a mar rating for each sample. The results are provided in Table I.

TABLE I

| Resin Sample | Mar Rating | |
| --- | --- | --- |
| | Steel | ABS |
| 3 | 6.5 | 7.0 |
| 4 | 8.0 | 6.5 |
| 5 | 8.5 | 8.5 |

EXAMPLE 3

Three samples are prepared according to the preparation described in Example 1 using Geon® 3400, 80 parts per hundred parts resin di-2-ethylhexyl phthalate plasticizer and 6.5 parts per hundred parts resin each of a stabilizer and costabilizer. The sheets of molded resin are placed in contact with steel coated with polyester-based paint and tested according to the methods described in Example 1. The average mar rating is 10.

EXAMPLE 4

Three samples are prepared according to the preparation described in Example 2 using Geon® 3400, 80 parts per hundred parts resin of di-2-ethylhexyl phthalate plasticizer, 8.6 parts per hundred parts resin of each of a stabilizer, costabilizer and fungicide, 75 parts per hundred parts resin of a filler. The sheets of molded resin are placed in contact with steel panels coated with polyester-based paint and ABS panels and tested according to the methods described in Example 2. The average mar rating for the steel panels is 6.0, and for the ABS is 11.0.

What is claimed is:

1. An article comprising a substrate providing a polymeric surface and said surface is in physical contact with a plasticized vinyl chloride resin composition comprising a crosslinked vinyl chloride resin and a monomeric plasticizer.

2. The article of claim 1 wherein the crosslinked vinyl chloride resin is a homopolymer of vinyl chloride.

3. The article of claim 2 wherein the vinyl chloride resin is crosslinked with a di- or polyfunctional crosslinking agent.

4. The article of claim 3 wherein the crosslinking agent is diallyl phthalate.

5. The article of claim 4 wherein the substrate is a rigid ABS sheet.

6. The article of claim 1 wherein the plasticizer is employed at between about 10 to about 200 weight parts per 100 weight parts of vinyl resin.

7. The article of claim 1 wherein the plasticizer is employed at between about 30 parts to about 140 parts per 100 parts by weight resin.

8. The article of claim 1 wherein the plasticizer is employed at between about 60 parts to about 130 parts per 100 parts by weight resin.

9. The article of claim 4 wherein the substrate is steel coated with a polyester-based paint.

10. The article of claim 9 wherein the plasticizer has a molecular weight of greater than 370.

11. The article of claim 10 wherein the vinyl chloride resin composition is formed by extrusion or compression molding.

12. The article of claim 8 wherein the vinyl chloride resin composition further comprises magnetized metal filings and the product is formed by extrusion or injection molding.

13. The article of claim 12 wherein the vinyl chloride resin composition is a refrigerator gasket and the substrate is a wall of the refrigerator.

14. The article of claim 13 wherein the vinyl chloride resin composition loses less than about 12% of its initial weight after exposure to 110° C. for seven days.

15. The article of claim 8 wherein the polymeric surface exhibits a mar rating of greater than or equal to 5 after exposure to 70° C. for 17 days.

16. The article of claim 9 wherein the plasticizer is a phthalate or trimellitate ester.

17. The article of claim 16 wherein the plasticizer is di-2-ethylhexyl phthalate.

18. The article of claim 17 wherein the plasticizer is employed at between about 60 parts to about 130 parts per 100 parts by weight resin.

* * * * *